US006754721B2

(12) United States Patent
Heckel

(10) Patent No.: US 6,754,721 B2
(45) Date of Patent: Jun. 22, 2004

(54) METHOD FOR CONFIGURING A STATION CONNECTED TO A FIELD BUS

(75) Inventor: Andreas Heckel, Remshalden (DE)

(73) Assignee: Pilz GmbH & Co., Ostfildern (DE)

( * ) Notice: Subject to any disclaimer, the term of this patent is extended or adjusted under 35 U.S.C. 154(b) by 284 days.

(21) Appl. No.: 10/031,909

(22) Filed: Jan. 17, 2002

(65) Prior Publication Data

US 2002/0138668 A1 Sep. 26, 2002

Related U.S. Application Data

(63) Continuation of application No. PCT/EP00/06485, filed on Jul. 7, 2000.

(30) Foreign Application Priority Data

Jul. 22, 1999 (DE) .......................................... 199 34 514

(51) Int. Cl.[7] ................................................ G06F 3/00
(52) U.S. Cl. .................. 710/4; 710/3; 710/9; 709/251; 709/253; 711/204; 711/213; 370/255; 370/257; 370/258; 370/909
(58) Field of Search ..................... 710/3, 4, 9; 709/251, 709/253; 711/204, 213; 370/255, 257, 258, 909

(56) References Cited

U.S. PATENT DOCUMENTS

| | | | |
|---|---|---|---|
| 5,023,867 A | | 6/1991 | Badaoui |
| 5,519,636 A | | 5/1996 | Stoll et al. |
| 5,530,896 A | | 6/1996 | Gilbert |
| 5,805,926 A | | 9/1998 | Le Van Suu |
| 5,900,022 A | * | 5/1999 | Kranich ...................... 711/205 |
| 5,956,752 A | * | 9/1999 | Mathews .................... 711/204 |
| 6,343,331 B1 | * | 1/2002 | Stirling ....................... 709/251 |
| 6,553,482 B1 | * | 4/2003 | Witt ........................... 712/216 |
| 6,654,382 B1 | * | 11/2003 | Bare et al. .................. 370/463 |

FOREIGN PATENT DOCUMENTS

| | | |
|---|---|---|
| DE | 38 38 152 | 5/1990 |
| DE | EP 38 89 214 | 11/1994 |
| DE | 38 55 925 | 12/1997 |
| DE | 197 33 906 | 2/1999 |
| DE | 199 34 514 | 2/2001 |
| EP | 0 459 527 | 11/1985 |
| EP | 0 325 080 | 1/1988 |
| EP | 0 308 449 | 9/1988 |
| EP | 0 586 715 | 8/1992 |
| EP | 0 624 832 | 2/1994 |
| EP | 0 898 442 | 8/1997 |

OTHER PUBLICATIONS

Intel Corp., "Distributed Control Modules Databook", Printed in USA 04100/684/15K/MB, 1984, pp. 36–38, 70–89.
W. Bohrer, Journal "Electrotechnik für die Automatisierungstechnik, Exakt Synchron", pp. 30, 32, & 33, Jun. 1998.
Andrew S. Tanenbaum "Computernetzwerke, 3. Auflage, Prentice Hall", 1998 pp. 252, 314–316.
Kongressband, ISBN 3–7723–2212–3 zum Fachvortrag iNet 96, Jun. 18–Jun. 20, 1996, pp. 6–9, 54–61.
Request for Comments from http://ww.rfc–editor.org/overview.html.
RFC index from ftp:/ftp./isi.edu/in–notes/rfc–index.txt.
Croft et al., Bootstrap Protocol (BOOTP), Network Working Group Request for Comments 951, Sep. 1985.
"Interbus–Grundlagen und Praxis" by Baginsky et al., Hüthig Verlag Heidelberg, 1998, pp. 19–21, 27–41.

* cited by examiner

Primary Examiner—Jeffrey Gaffin
Assistant Examiner—Niketa Patel
(74) Attorney, Agent, or Firm—Cohen, Pontani, Lieberman & Pavane

(57) ABSTRACT

The present invention describes a method for configuring a station connected to a field bus, wherein a logical address is allocated to said station. The method comprises the steps of: transmitting said logical address from an address-allocation unit to said station; transmitting a physical address from said address-allocation unit to said station, said physical address corresponding to an assumed physical position of said station relative to said field bus; verifying said physical address being transmitted to said station based on an actual physical position of said station relative to said field bus; and storing said transmitted logical address in a memory of said station depending on the verification of said physical address.

20 Claims, 2 Drawing Sheets

METHOD FOR CONFIGURING A STATION CONNECTED TO A FIELD BUS

CROSSREFERENCES TO RELATED APPLICATIONS

This application is a continuation of copending international patent application PCT/EP00/06485 filed on Jul. 7, 2000 and designating the U.S., which claims priority of German patent application DE 199 34 514.7 filed on Jul. 22, 1999.

BACKGROUND OF THE INVENTION

The present invention relates to a method for configuring a station connected to a field bus, wherein a logical address is allocated to said station, and in particular to a method of allocating a logical address to such a station.

The invention further relates to a station suited for being connected to a field bus and having means for receiving and evaluating a bus telegram, said station further having a memory for storing a logical address which is to be allocated to said station.

A field bus is a communication system especially used in industrial automation technology for connecting spatially distributed sensors and actuators to higher-order controls and computers. It is a characteristic feature of such a field bus that the different units connected to the field bus are connected one with the other via a collective bus line which allows, at least in principle, any units to communicate one with the other via the field bus, without being individually connected by cables. The units connected to the field bus will be generally referred to as stations hereafter.

With field buses data transmission as such takes place based on fixed rules, known as protocols. With respect to such protocols, two basic kinds of field buses can be distinguished, namely field buses with a so-called message-oriented transmission method on the one hand, and field buses with a so-called I/O-oriented transmission method on the other hand. In case of the first-mentioned transmission method each station is allocated a unique address. For transmitting data from one station to another, the transmitting station adds the address of the receiving station to the data telegram comprising the message to be transmitted, as prescribed by the selected protocol. Being supplemented by that address, the data telegram is then dispatched via the bus line, and the receiving station can recognize from the address allocated to it that the message is intended for it. It is a matter of course that each station must necessarily know the address allocated to it with such message-oriented transmission methods. Usually, the address is assigned to the stations by means of coding switches which must be present in each station, and on which the address assigned to the respective station is preset. The field bus known as CAN bus may be taken as an example of a field bus working with a message-oriented transmission method.

In contrast, an I/O-oriented transmission method does not require allocation of a unique address to each of the different stations, at least not in principle. Rather, communication between stations is effected under control of a higher-order station, known as bus master. The bus master is the only authority capable of initiating data traffic. The bus master has exact knowledge of the structure of the bus, especially the sequence and order of the stations connected to the bus. The bus master transmits an exactly specified data frame that contains as many data fields as stations are connected to the field bus. The data fields of the data frame are circulated from one station to the next and finally back to the bus master. Once the bus master receives the start word of the data frame initiated by itself, i.e. the data frame has been fully circulated through the entire ring structure of stations, it generates a signal that causes all stations to take over the message present at the respective station at the moment of that signal. Consequently, distribution of data to be transmitted to the different stations is established here based on the bus structure known to the bus master, the latter "fills" the data fields of the data frame in an appropriate way. The field bus known as Interbus may serve as a preferred example of a field bus using such a transmission method.

A detailed description of the Interbus is found, for example, in the German book entitled "Interbus— Grundlagen und Praxis (Fundamentals and Practice)" by Baginski et al., published by Hüthig-Verlag, 1998. As a special advantage of the Interbus, this book underlines that no unique addresses are required for data transmission. This also means that there is no need to equip the different stations with coding switches or the like.

For safety-critical processes, such as monitoring of emergency tripping devices, no field bus systems have been used heretofore, since the ideally desired 100% failsafety could not be guaranteed due to their freely accessible structure. It was only recently that it was tried to use field bus systems also in safety-critical applications by means of additional failsafety measures such as additional protocols intended to guarantee failsafety. As part of these safety protocols, addresses are to be assigned also in case of the Interbus, at least to those stations that are involved in safety-critical processes. Said addresses then allow such stations to check if a message received is actually intended for themselves. Errors may occur, for example, if changes are made in the order or the type of the stations actively connected to the Interbus and if the bus master does not get knowledge of such changes quickly enough. This may happen erroneously when a station is exchanged, for example.

For implementing a failsafe Interbus it is therefore a requirement that addresses be allocated to the failsafe stations in a failsafe way. This has been achieved heretofore by providing the stations with a coding switch which is preset in a suitable way to allocate the unique address to the station. Such kind of address will be described hereafter as logical address, because it may be independent of the physical structure of the field bus, and especially of the sequence of the connected stations.

However, use of coding switches for allocating logical addresses causes certain disadvantages. One of such lies in the fact that any coding switch requires mechanically adjustable elements in some form or the other. Mechanical components, however, are comparatively costly in terms of production so that their mass production is expensive compared with purely electronic components. In addition, mechanical components are always subject to wear which prevents to employ simple components, especially in the case of safety-critical applications. A further disadvantage connected with the use of coding switches can be seen in the fact that such switches must always be located near the particular station. For complex process controls in industrial applications, however, the different stations connected to the field bus may be remote one from the other by up to several hundred meters. When coding switches are used, the logical addresses must be allocated in this case at the very location of the station so that in some cases long distances must be overcome that make the setting and configuration laborious and complicated. Finally, such decentralized configuration measures always involve the risk that track may be lost, which may result in erroneous allocations of addresses, especially when a defective station is exchanged.

SUMMARY OF THE INVENTION

It is an object of the present invention to provide a method of the before-mentioned kind by means of which a station can be allocated a logical address in a failsafe manner and without any mechanically operable coding switches being required. In addition, it is an object of the present invention to provide a station of the before-mentioned kind that can be configured using such a method.

This object is achieved by a method as mentioned at the outset, said method comprising the steps of transmitting the logical address from an address-allocation unit to the station;

transmitting a physical address from the address-allocation unit to said station, said physical address corresponding to an assumed physical position of said station relative to the field bus;

verifying said physical address that has been transmitted to said station based on an actual physical position of said station relative to the field bus; and storing said transmitted logical address in a memory of said station depending on the verification of said physical address.

The object of the invention is further achieved by a station of the before-mentioned kind that comprises means for verifying a physical address transmitted to it, said means acting upon the memory provided for storing said logical address.

According to the inventive method, the logical address is transmitted to the station in the form of a data value. This may be accomplished via a communication link connected to the station specifically for that purpose. As will be described hereafter in more detail, however, it is also possible to transmit the logical address to the station in the form of a data value directly via the field bus. In any case, there is no need for any mechanically adjustable coding switches. Rather, the logical address can simply be defined by means of software in the address-allocation unit, a process which is known as such. In the simplest of all cases, the address-allocation unit comprises a commercially available computer by means of which the station can be accessed via suitable software. A so-called CMD tool (Configuration Management Diagnosis) available from Phoenix Contakt GmbH & Co. in Blomberg, Germany, is an example of such a software for the Interbus. In addition to the commercially available computer, however, the inventive address-allocation unit may also comprise an adapter unit by means of which the logical address defined by the computer is converted to a data word that can be transmitted via the field bus. In case of the Interbus, for example, the CMD tool is connected to the bus master via a V.24 interface so that in this case the address-allocation unit comprises the bus master and, if applicable, a control unit that may be connected to the latter, in addition to the before-mentioned computer. However, in cases where a commercially available computer, by way of example, is directly coupled to a station, the bus master is not necessarily included in the address-allocation unit.

Due to the fact that a physical address is transmitted to the station in addition to the logical address, said physical address corresponding to the actual physical position of the station relative to the field bus (for example position "2" in the field bus), any erroneous allocation of the logical address to an incorrect station (a station located, for example, at position "3") is prevented. This ensures the failsafety necessary for safety-critical processes.

Depending on the verification of the physical address, the transmitted logical address may be stored, for example, in what is known as an EEPROM, i.e. an electronically recordable permanent memory. Corresponding to the inventive method, the inventive station therefore comprises such a memory that can be written to in response to a verification result.

The above features provide the advantage that one can do without the use of mechanical coding switches, whereby the before-mentioned disadvantages connected with such switches are eliminated. The inventive station can therefore be produced at lower cost without any sacrifice with respect to failsafety.

Thus, the object of the invention is perfectly achieved.

According to an especially preferred embodiment of the inventive method, the logical and the physical addresses are transmitted to the station via the field bus.

This feature provides the advantage that the configuration of the station can be effected from a central point even if the respective station is located a long way remote from that central point, which is frequently the case especially with field buses in industrial applications. The configuration of the station is therefore greatly facilitated by the described feature. Furthermore, no additional cabling of the station is required for the implementation of the inventive method. This again helps facilitate the configuration. In principle, transmission of the two before-mentioned addresses can be effected through the field bus, as part of a special configuration mode, with both message-oriented bus systems and I/O-oriented bus systems. However, with the last-mentioned bus systems such transmission can be realized with special ease because they do not require any predefined addresses for the transmission of data. Insofar, the described feature is particularly advantageous for buses with I/O-oriented transmission methods.

According to another preferred embodiment of the inventive method, the logical address and the physical address are transmitted to the station in a common data telegram.

This feature provides the advantage that failsafety is once more increased due to the almost simultaneous transmission. If checking methods, known as such, are used for checking a data telegram, it is thereby prevented that an invalidated logical address may be transmitted in combination with a correct physical address without the station being in a position to detect such a defect. In addition, it is thereby prevented that changes can be made to the bus system between transmission of the logical address and transmission of the physical address, which would again result in an incorrect allocation of addresses.

According to a further preferred embodiment of the inventive method, the station determines its current actual physical position, relative to the field bus, by means of a position-determining unit. A corresponding station is characterized in that the before-mentioned means comprise a position-determining unit for determining an actual physical position of the station relative to the field bus.

This feature provides the advantage that failsafety with respect to the allocation of an address is once more improved due to determining the current physical position of the station. Alternatively and by way of example, it would also be feasible to inform the station about the physical position relative to the field bus envisaged for it in a different way. However, having the position currently determined by means of a position-determining unit guarantees that even inadvertent alterations of the structure of the field bus will be detected so that errors, which may occur in connection with the allocation of addresses, will be detected without any doubt.

According to a further development of the before-mentioned features, the telegram traffic on the field bus is of a circulating nature, and the station determines its actual physical position by counting cyclic events in the circulating telegram traffic. Correspondingly, the position-determining unit of the inventive station comprises a counter for counting cyclic events occurring in the circulating telegram traffic.

This feature provides the advantage that the actual physical position can be determined in a very simple and, nevertheless, reliable way. The reason is that, in case of circulating telegram traffic, the different data packages are handed on successively from one station to the next with the result that waiting times passing until a station receives a start word of the telegram traffic correspond to the position of that station in the order of stations. The waiting time can be determined in a technically very simple manner by counting said cyclic events. Possible cyclic events for this purpose are especially clock pulses by means of which the data traffic is synchronized on the field bus.

According to a further embodiment of the before-mentioned feature, the field bus is an Interbus and the station counts cyclic events during a so-called ID cycle of the Interbus until it encounters the start word of the circulating telegram traffic.

This feature has the advantage that the so-called ID cycle is exactly defined for an Interbus, and, moreover, can be initiated by each station at any time by means of an error message. Therefore, said feature is especially advantageous in connection with an Interbus, since no expensive hardware or software measures are required for determining the actual position of a station, except for a counter in the station. In addition, said feature is fully within the specifications allowed for the Interbus so that an address may be allocated even to individual selected stations without disturbing the overall bus traffic thereby and without interfering with the basic Interbus specifications.

According to a further advantageous development of the before-mentioned features, the station uses an ID cycle initiated by another station, especially a bus master, for the determination of its position.

This feature provides the advantage that the station can determine its actual physical position without influencing the traffic on the Interbus. Thus, the verification can be performed without influencing the other stations connected to the bus. A particularly advantageous solution is achieved if the station determines its position during each ID cycle occurring because any changes occurring on the bus can be determined quickly in this way. As a standard, an ID cycle is performed at least following every startup of the bus.

According to another advantageous embodiment, the station uses for the determination of its position an ID cycle that is initiated by itself after receipt of the physical address.

This feature provides the advantage that the station can verify the physical address received immediately after receipt thereof, whereby any errors are avoided resulting from changes that may have occurred in the bus structure in the meantime. Therefore, said feature provides the advantage that failsafety is further improved.

According to a further development of the inventive method, the physical address is selected as logical address.

This feature provides the advantage that a only single data value needs to be transmitted for carrying out the inventive method, said single data value can be verified by the station based on its actual physical position, and said single data value can then be used by the station as its logical address. Data capacity of the station can therefore be selected correspondingly small.

According to an alternative development of the before-mentioned feature, the logical address is selected independently of the physical address.

This feature provides the advantage that the logical address can be selected based on freely definable criteria so that a much broader variation range is available all in all. In addition, due to said feature it is no longer necessary to reassign addresses within the field bus system when new stations are connected to or separated from the field bus.

It is to be understood that the features recited above and those yet to be explained below can be used not only in the respective combination indicated, but also in other combinations or in isolation, without leaving the context of the present invention. In particular, the invention is not restricted to applications with I/O-oriented field buses, but can be used with all stations that are to be allocated an address.

BRIEF DESCRIPTION OF THE DRAWINGS

Exemplary embodiments of the invention are shown in the drawings and are explained in more detail in the description which follows. In the drawings.

DETAILED DESCRIPTION OF PREFERRED EMBODIMENTS

Figure 1:
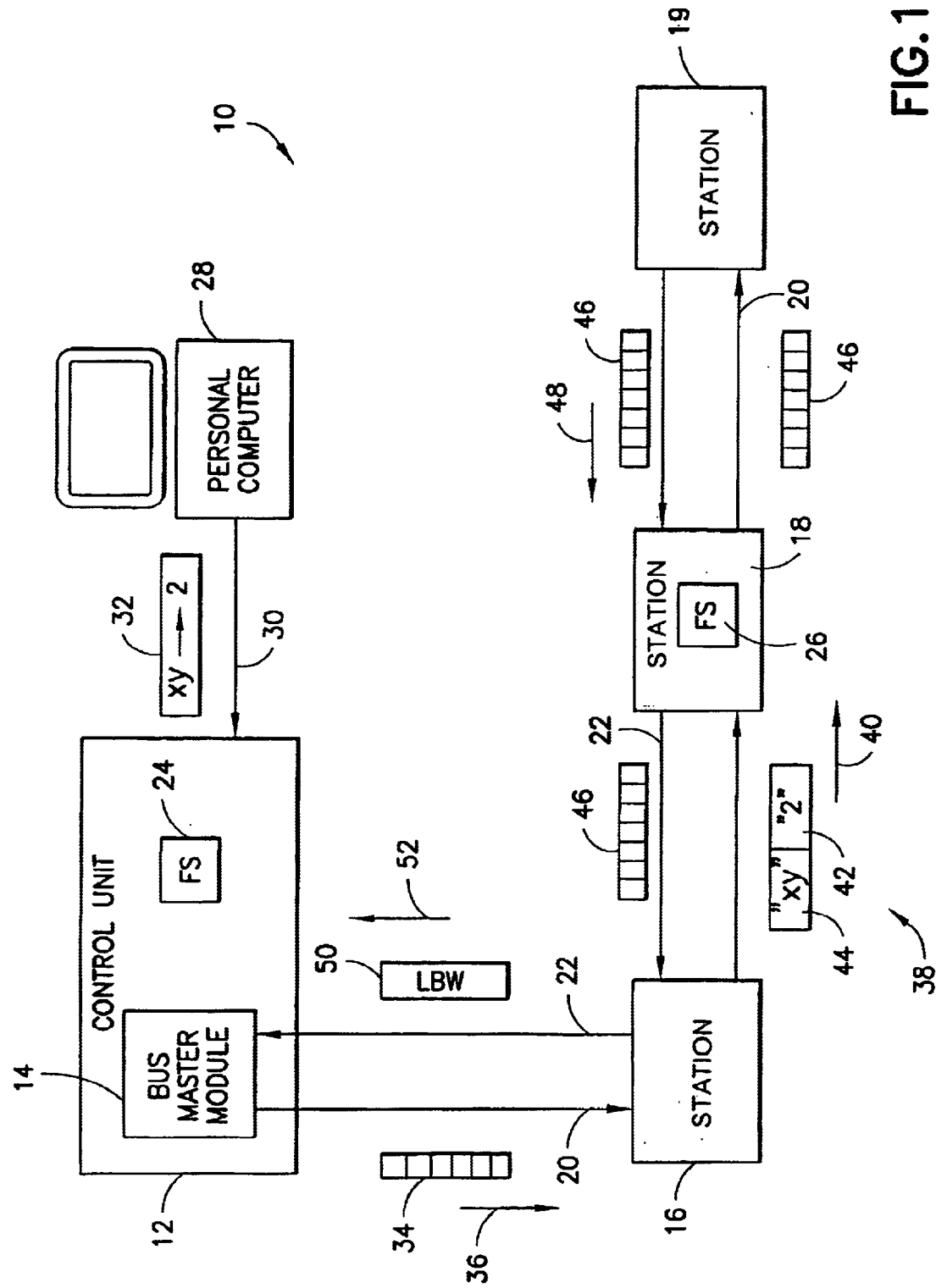
FIG. 1 shows a field bus system in which is carried out the inventive method for configuring a station.

In FIG. 1, a field bus with stations connected thereto is designated in its entirety by reference numeral 10. The field bus 10 is an Interbus in the present case.

By way of example, a control unit 12 with a bus master module 14 and three stations 16, 18 and 19 are connected to the Interbus 10. The control unit 12 comprises additional means—not shown in detail—for monitoring and controlling processes. For this purpose, the control unit 12 is supplied with data from stations 16, 18, 19, said stations in turn being connected to sensors and actuators not shown in the drawing. A system of this kind is known per se so that it will not be described in more detail here.

As an alternative to this embodiment, the bus master module 14 may be connected to the field bus 10 separately from the failsafe control unit 12.

In the present case, bus master module 14 is a so-called USC/4 which has found widespread use in the field of Interbus applications. The bus master module 14 is connected to the stations 16, 18, 19 by a forward data line 20 and a return data line 22 to form sort of a ring system. The data are circulated from one station to the next on data lines 20, 22.

For purposes of the present example it has been assumed that the control unit 12 serves for controlling safety-critical processes, among others, as for example for monitoring an emergency tripping device. Accordingly, a monitoring signal of the emergency tripping device—not shown—is supplied to station 18. Since the process is a safety-critical process, both control unit 12 and station 18 are provided with safety-related means 24, 26 that permit failsafe data communication using the Interbus, although the latter is not failsafe as such. Such safety-related means 24, 26 are known in connection with monitoring and control of safety-critical processes and include, for example, diversity-based redundant systems that check each other during the processing of data.

Reference numeral 28 designates a commercially available personal computer which is connected to control unit 12 via a data line 30. The connection is here implemented via a commercially available V.24 interface. Using a known Interbus administration software (such as the CMD tool from Phoenix Contact GmbH & Co. in Blomberg, Germany), computer 28 generates a data telegram 32 which, for purposes of carrying out the inventive method, essentially includes the instruction to assign a logical address "xy" to the station having the physical address "2". The physical address "2" corresponds in this case to the position of the addressed station within the ring structure of the Interbus 10. In the present case, this is station 18, if one counts the units connected to the Interbus 10, starting with the control unit 12 at zero.

Reference numeral 34 designates a data telegram being transmitted in the direction indicated by arrow 36 from bus master module 14 to station 16 via data line 20. The data telegram 34 is part of a data frame generated by the bus master module 14, which contains all the data telegrams circulating at one time within the Interbus 10.

Another data telegram, which is transmitted from station 16 to station 18 in the direction indicated by arrow 40, is designated by reference numeral 38. Data telegram 38 conveys a physical address 42 and a logical address 44 that are transmitted from computer 28 through the safety-related means 24 to station 18, according to the inventive method.

The data frame circulating on the Interbus 10 further comprises data telegrams 46 that are circulated on the Interbus 10 in the direction indicated by arrows 40, 48. A further data telegram, which is part of the described data frame, is designated by reference numeral 50. Data telegram 50 comprises a well defined start word of the Interbus, usually known as "Loop Back Word" (LBW). In the situation illustrated in FIG. 1, the data telegram 50 is transmitted in the direction indicated by arrow 52, i.e. from station 16 back to bus master module 14.

As is generally known, the bus master module 14 generates a signal as soon as it receives data telegram 50, originally generated by itself and comprising the start word. Receipt is interpreted as a sign that the entire data frame has once been circulated through the entire Interbus 10. The stations 16, 18, 19 connected to the Interbus 10 conclude from the signal generated (not shown in the drawing) that the data telegram last received by each of them is intended for them. Therefore, station 18 receives the message with the physical address 42 and the logical address 44 in this case.

Figure 2:
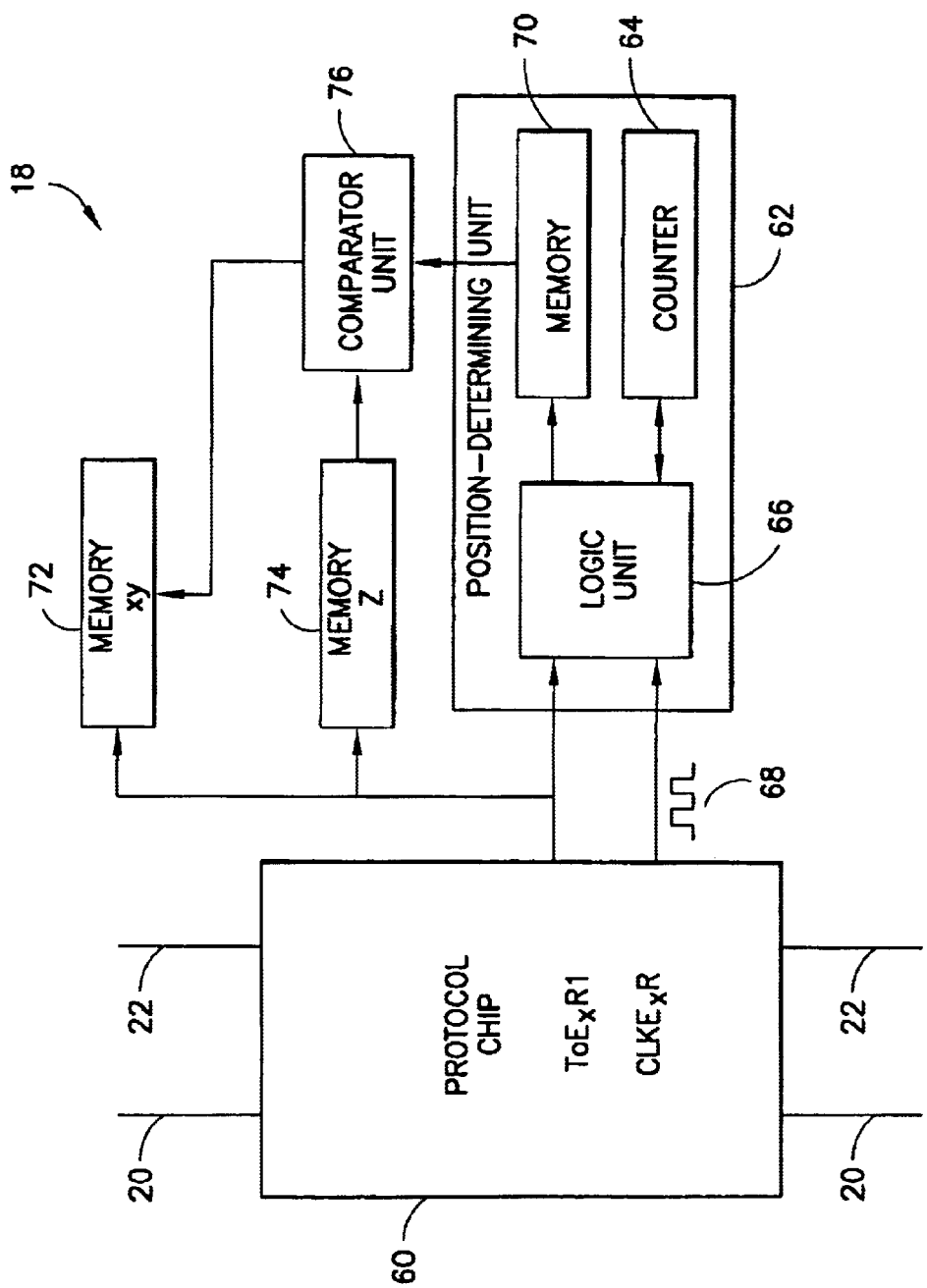
FIG. 2 shows a diagrammatic representation of an inventive station based on the Interbus by way of example.

FIG. 2 shows a diagrammatic representation of station 18 with those components that are essential for the invention.

In the embodiment described, station 18 comprises a protocol chip 60, known per se, that provides for the connection to the Interbus 10. Protocol chip 60 is a standard module that is generally known in connection with the implementation of Interbus applications. It implements largely autonomously the data communication protocol required in accordance with the Interbus specifications, and it is therefore connected to the data lines 20, 22 in a manner known per se. The protocol chip 60 essentially comprises a shift register through which the different data telegrams are shifted until the data telegram 50 comprising the start word is returned to the bus master module 14. Due to the structure of the Interbus 10, the data contained in the shift register at that moment are intended for station 18.

Reference numeral 62 designates a position-determining unit which permits station 18 to determine its actual physical position relative to the Interbus 10. For this purpose position-determining unit 62 comprises a counter 64 which is driven by a logic unit 66. The logic unit 66 in turn is supplied with clock pulses 68 that are generated as a standard function by protocol chip 60 and that are used for synchronizing the data traffic on the Interbus 10. Furthermore, logic unit 66 receives the signals present on output ToExR1 of protocol chip 60 in order to be capable of detecting the data telegram 50 with the start word LBW when it has reached the protocol chip 60.

Reference numerals 70, 72 and 74 designate memories in which the currently determined physical position of station 18, the logical address 44 received, and the physical address 42 received can be stored.

Finally, reference numeral 76 designates a comparator unit by means of which station 18 can compare the physical address 42 received with the currently determined position stored in memory 70. According to the invention, the logical address 44 received is firmly stored in memory 72 only after the physical address 42 in memory 74 and the currently determined position of the station 18, as stored in memory 70, match each other.

For carrying out the inventive method, logical address 44 for station 18 is selected in computer 28 using the administration software. It is also possible to select physical address 42 of the station 18 as its logical address 44. In the present embodiment, however, the logical address 44 is selected independently of physical address 42, which is indicated in FIG. 1 by letters "xy". The allocation of the logical address "xy" to station 18 is then transmitted to control unit 12 via data line 30. The bus master module 14 embeds the logical address 44 and the physical address 42 in data telegram 38 and initiates the circulating data traffic on the Interbus 10. The two addresses 42, 44 are thereby transmitted to station 18. The latter verifies the physical address 42 by the procedure described hereafter, and if the address is found to be correct, stores the logical address 44 as the address assigned to it.

Once station 18 has received the data telegram 38, it forces a so-called ID cycle that triggers an exactly defined procedure in order to determine its current physical position. As part of that procedure, bus master module 14 generates a data frame in which a data telegram having a width of 16 bits is provided for each known station 16, 18, 19. The data frame starts with the start word LBW, as usual. The start word LBW is then circulated from one station 16, 18, 19 to the next, corresponding to the transmission method of the Interbus 10. Due to the firmly defined data width of 16 bits for each following data telegram, the number of clock pulses 68 counted until the start word LBW is received by the station 18 provides a measure for determining how many stations 16 are connected to the Interbus 10 between bus master module 14 and station 18. The logic unit 66 provided in station 18 counts only those clock pulses 68 that are required for transmitting the 16-bit data telegrams. Therefore, when station 18 receives the start word LBW, it is sufficient to divide that count number by 16 in order to determine the current position of station 18 relative to the Interbus 10. The position so determined is then stored in memory 70 and compared with the received physical address 42 present in memory 74.

Alternatively, or in addition to the above procedure, station 18 may also use any other ID cycle initiated in the Interbus for determining its actual position. For example, bus master module 14 especially initiates an ID cycle following each startup of the Interbus 10. Likewise, ID cycles are carried out every time another station 16, 19 emits a fault message.

What is claimed is:

1. In a system comprising a field bus and a station connected to said field bus, said field bus providing a circulating telegram traffic complying with existing Interbus specifications, a method of allocating a logical address to said station, said method comprising the steps of transmitting said logical address from an address-allocation unit to said station;

transmitting a physical address from said address-allocation unit to said station, said physical address corresponding to an assumed physical position of said station relative to said field bus;

determining an actual physical position of said station relative to said field bus by evaluating said circulating telegram traffic;

comparing said transmitted physical address and said actual physical position determined; and storing said logical address in a memory of said station if said physical address and said actual physical position match with each other.

2. The method of claim 1, wherein said actual physical position is determined by counting cyclic events occurring during an ID cycle of said Interbus.

3. A method of allocating a logical address to a station connected to field bus, said station having a position-determining unit, and said method comprising the steps of transmitting said logical address from an address-allocation unit to said station;

transmitting a physical address from said address-allocation unit to said station, said physical address corresponding to an assumed physical position of said station relative to said field bus;

determining an actual physical position of said station relative to said field bus by means of said position-determining unit;

verifying said transmitted physical address based on said actual physical position determined; and storing said logical address in a memory of said station if said physical address and said actual physical position match with each other.

4. The method of claim 3, wherein said field bus provides a circulating telegram traffic having a plurality of cyclic events, and said position-determining unit determines said actual physical position by counting said cyclic events.

5. The method of claim 4, wherein said field bus is an Interbus having at least one ID cycle and a start word at the beginning of said ID cycle, wherein said cyclic events occur during said at least one ID cycle, and wherein said position-determining unit counts said cyclic events for determining said position until said station receives said start word.

6. The method of claim 5, wherein said station initiates said ID cycle.

7. The method of claim 3, wherein said logical address and said physical address are transmitted to said station via said field bus.

8. A method of configuring a station connected to a field bus, wherein a logical address is allocated to said station, said method comprising the steps of transmitting said logical address from an address-allocation unit to said station;

transmitting a physical address from said address-allocation unit to said station, said physical address corresponding to an assumed physical position of said station relative to said field bus;

verifying said physical address being transmitted to said station based on an actual physical position of said station relative to said field bus; and storing said transmitted logical address in a memory of said station depending on said step of verification of said physical address.

9. The method of claim 8, wherein said logical address and said physical address are transmitted to said station via said field bus.

10. The method of claim 8, wherein said logical address and said physical address are transmitted to said station by means of a common data telegram.

11. The method of claims 8, wherein said station determines said actual physical position relative to said field bus by means of a position-determining unit.

12. The method of claim 11, wherein said field bus provides a circulating telegram traffic, and said position-determining unit determines said actual physical position by counting cyclic events of said circulating telegram traffic.

13. The method of claim 12, wherein said field bus is an Interbus having at least one ID cycle, cyclic events occurring during said ID cycle, and a start word at the beginning of said circulating telegram traffic, wherein said position-determining unit counts said cyclic events for determining said position until it receives said start word.

14. The method of claim 13, wherein said position-determining unit determines said position by counting said cyclic events in an ID cycle that is initiated by another station.

15. The method of claim 14, wherein said other station is a bus master.

16. The method of claim 13, wherein said position-determining unit determines said position by counting said cyclic events in an ID cycle that is initiated by itself after receipt of said physical address.

17. The method of claim 8, wherein said physical address is selected as said logical address.

18. The method of claim 8, wherein said logical address is selected independently of said physical address.

19. A Station for connecting to a field bus, said station comprising a receiver for receiving a logical address which is to be allocated to said station, and for receiving a physical address which corresponds to an assumed physical position of said station relative to said field bus, said station further comprising a position-determining unit for determining an actual physical position of said station relative to said field bus, a memory for storing said logical address, and a comparator unit for comparing said physical address transmitted and said actual physical position determined, wherein said comparator unit acts upon said memory in dependence of a match found between said physical address transmitted and said actual physical position determined.

20. The station of claim 19, wherein said field bus provides a circulating telegram traffic, and said position-determining unit comprises a counter for counting cyclic events occurring in said circulating telegram traffic.

* * * * *